Sept. 5, 1939.  C. A. STOKES  2,171,716
PROJECTOR
Filed July 3, 1937   3 Sheets-Sheet 1
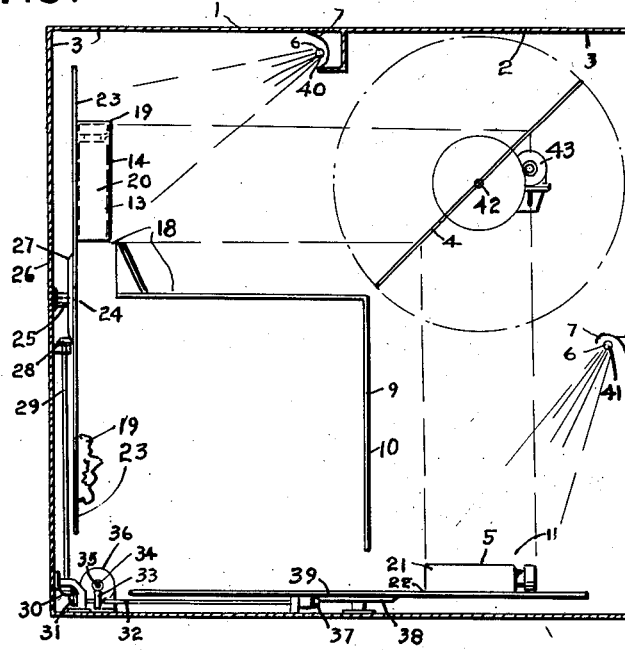
INVENTOR.
CECIL A. STOKES.
BY Paul A. Talbot.
ATTORNEYS.

Sept. 5, 1939.  C. A. STOKES  2,171,716
PROJECTOR
Filed July 3, 1937  3 Sheets-Sheet 2
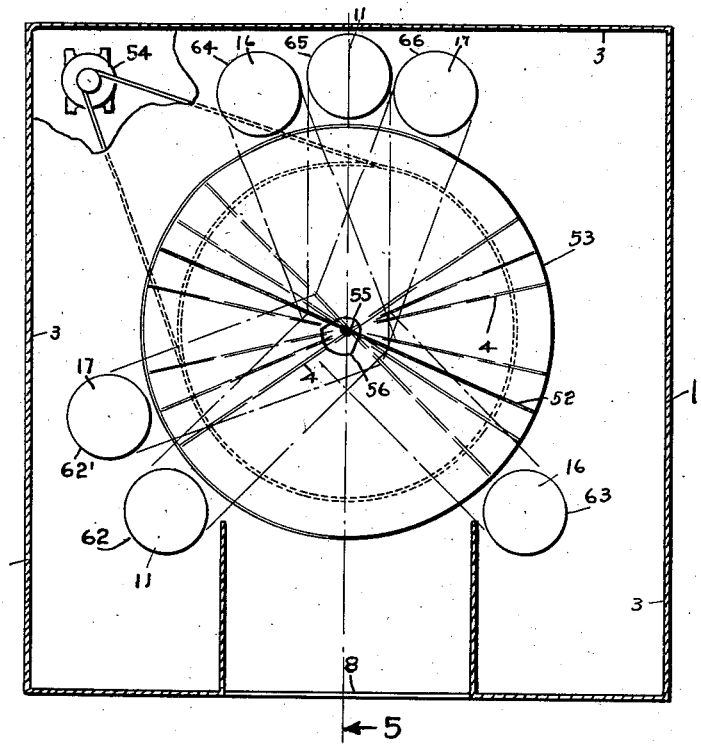
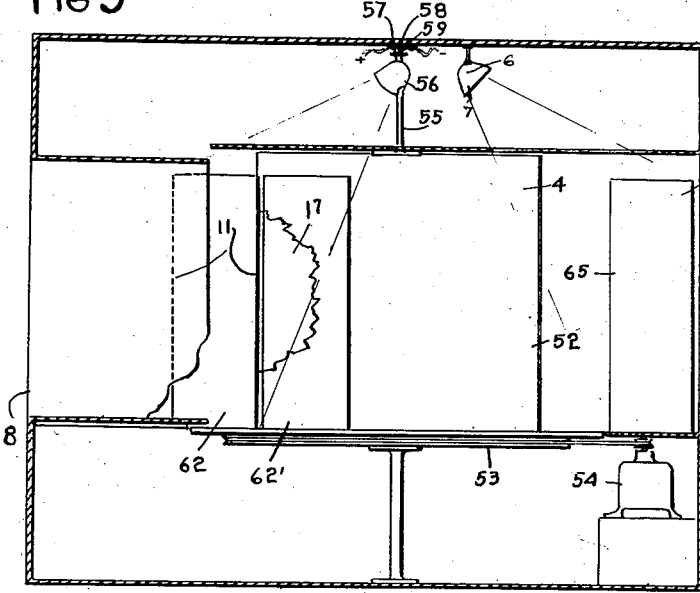
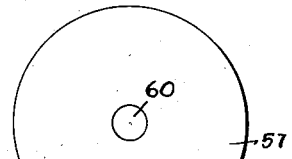
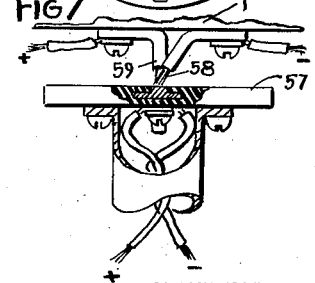
INVENTOR.
CECIL A. STOKES
BY Paul A. Talbot
ATTORNEYS.

Sept. 5, 1939.  C. A. STOKES  2,171,716
PROJECTOR
Filed July 3, 1937  3 Sheets-Sheet 3
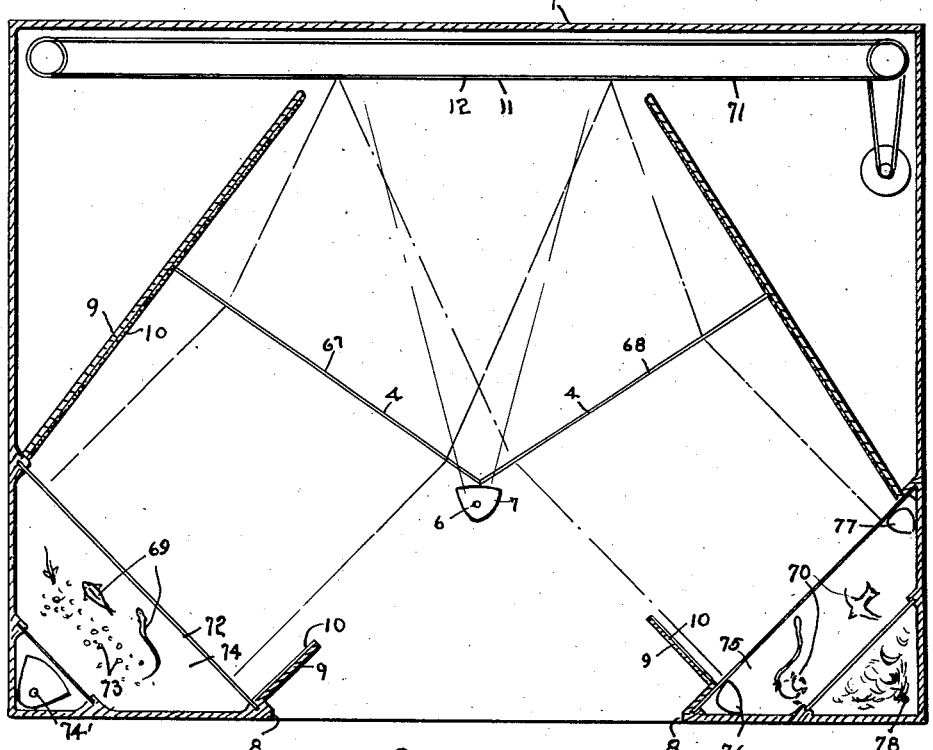
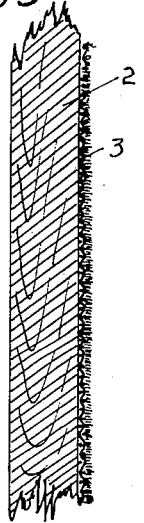
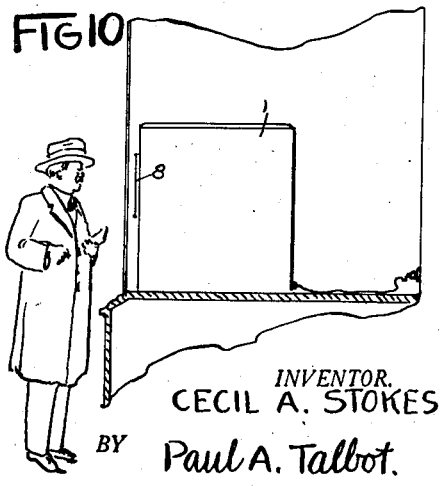
INVENTOR.
CECIL A. STOKES
BY Paul A. Talbot.
ATTORNEYS.

Patented Sept. 5, 1939

2,171,716

UNITED STATES PATENT OFFICE 2,171,716

PROJECTOR

Cecil A. Stokes, New York, N. Y.

Application July 3, 1937, Serial No. 151,791

6 Claims. (Cl. 272—13)

My invention relates to projectors for dissolving or superimposing images upon a screen or background or upon each other by reflection and projection and has among its objects to provide:

An animate third dimension projector.

An advertising display showing the package and its contents.

A projector which shows the location and close-ups in third dimension dissolving one into the other.

A transparent reflecting device for projecting the image in lifelike and animated full vision of an object out of vision and to dissolve animate and inanimate objects upon a field or in front of the plane of the field.

To provide a reflecting projector which shows full lifelike objects which appear as before the eye and which are in fact hidden from view and superimposing such objects upon or at apparently the same place.

An optical illusion for advertising.

An inclosure or cabinet having light reflectors combined with non-reflecting surfaces and invisible transparent reflectors.

A means of controlling and synchronizing illumination with the advent of moving objects appearing at a predetermined location.

A revolvable transparent reflector which may be turned to reflect a plurality of objects at what appears as a single location or at nearby relative location.

A means of reflecting animate or inanimate objects in full perspective and at varying distances from the point of vision.

I accomplish these and other objects by the construction herein described and shown in the accompanying drawings forming a part hereof in which:

Fig. 1 is a sectional elevation of my device projecting horizontal object to vertical.

Fig. 2 is partial elevation of Figure 1.

Fig. 3 is a plan of the arrangement of a plurality of stationary reflectors and objects.

Fig. 4 is a plan of my device showing the revolving reflector.

Fig. 5 is a section taken on line 5 of Figure 4.

Fig. 6 is a plan of the timing commutator.

Fig. 7 is a fragmentary detail of the commutator and brushes.

Fig. 8 is a plan of the arrangement of a plurality of reflectors for imposing live aquatic objects with birds and animals.

Fig. 9 is a fragmentary detail of my non-reflecting surface.

Fig. 10 is a perspective view showing one of the applications of my device.

Similar reference characters refer to similar parts throughout the several views of the accompanying drawings and in the specifications to follow.

My invention is primarily concerned with improved construction and application of the use of the transparent reflector, used in the past to some extent in illusions and legerdemain, applying the reflectors in an enclosure particularly for advertising purposes.

A plain thin sheet of glass or other transparent material similar to it is capable of reflecting and projecting any well lighted animate or inanimate object to a point behind the glass equal to the distance between the glass and the object. Thus unlike a mirror, the image of the object when thus reflected is actually projected into space or onto a plane or another object if located at the same point where the reflected object is projected. Furthermore, the spectator, located so as to see the reflected object, looks through the reflecting surface without detecting its presence. Several such reflectors may be combined to reflect several objects projecting them all to the same point or one may reflect the object ahead of or above, below, or to one side of the other reflected object.

As may be seen from the drawings, the reflection of the object is seen at a point beyond the reflector at the same angle as the light rays from it approach the reflector, thus if the reflector is set at 45 degrees the rays from the lighted object are directed at 90 degrees to the reflected object.

I do not claim to be the inventor of these scientific principles but my invention consists of an improved apparatus to use them which consist of a housing 1 having a part of the walls 2 covered with a non-reflecting surface 3, such as black plush, velvet, etc. The reflecting plane 4 or several such planes are secured to the housing and the objects 5 to be reflected are illuminated by lights 6 and light reflector 7. A single window or opening 8 is provided through which the spectators may view the reflected objects and is so positioned that many of the parts are obscured behind the partitions 9, some of the surfaces of which are provided with non-reflecting surfaces 10.

In Fig. 3 the position 11 where the display of objects 12 and the reflected objects 13 are seen is arranged a predetermined distance beyond the opening of the window 8 and the reflected objects 14 are seen at the position 15 between the window 8 and the position 11. Other reflected objects and objects on display are positioned at 16 and 17 at one or the other of the sides of the position 11 and easily seen through the window 8. (See Figure 4.)

Referring to Figures 1 and 2, the housing 1 is provided with the table 18 upon which the object 19 and reflected image 20 may be seen through the window 8. The object 21 which is reflected is positioned at 22 below and to the front of the table 18. The object 19 and other objects may be secured to the vertical turntable 23 revolving about the axis 24 on the stud 25 secured to the rear wall 26 of the housing 1 and may be revolved by the bevel gear 27 meshing with the bevel pinion 28 at the upper end of the vertical shaft 29 having a bevel gear 30 at its lower end meshing with the bevel gear 31 on the horizontal shaft 32 which is rotated by the worm gear 33 which is secured to said shaft and meshes with the worm 34 on the shaft 35 secured to and driven by the motor 36. The shaft 32 is provided with the bevel pinion 37 meshing with the bevel gear 38 which is secured to the horizontal turntable 39 to which the objects to be reflected 21 may be secured.

The reflecting plane 4 is arranged at 45 degrees to each of the objects 19 and 21 so positioned that the reflected object 20 and the object 19 seem to be in the same position when viewed through the window 8.

When the projection light 40 is on illuminating the object 19, which for instance may be a box, by subduing said light and turning the projecting light 41 on full the image of the object 21 which may be a bottle of perfume will appear at 20 and is shown as if it were seen through the otherwise opaque sides of the box.

The timing of the projecting lights and the turntable may bring into view many objects secured to the horizontal and vertical turntables giving the appearance of accomplishing many impossible feats as illustrated above with the box and its bottle of perfume. By timing the lights to fade out completely or partially so, the bottle may appear to enter the box by revolving the reflecting plane 4 on the axis 42 by the motor 43.

Figure 3 shows two objects 44 and 45 arranged at either side of and out of view from the window 8. Object 44 may be seen reflected through the plane 46 at the point 47. Object 45 is reflected through the plane 48 and also appears at the point 47. Each of the objects 44 and 45 may be reflected to appear simultaneously or in rotation at the point 47 by adjusting the projecting lights 49 and 50. By the movement of the plane 48 to the position 48' the object 45 is reflected to appear at the point 51.

By a movement of the plane 48 the object 45 may be made to appear in two different positions at 47 or 51 by shutting off and turning on the light projector 50 and by leaving the projector 50 on and moving the plane 48 on the center the reflected object may appear to advance or retract between the points 47 and 51.

Figure 4 shows the plane 52 mounted on the turntable 53 revolved by the motor 54. At the top of the plane 52 and revolving about the axis 55 on which the plane revolves, I have provided the revolving light projector 56 and in axial alignment with it the commutator 57 which is provided with the brush 58 and brush 59 making contact with the center contact 60 and one or more segmental contacts 61 to illuminate the objects 62, 62' and 63, one located on each side of the window 8 to project the rays from one or the other of said objects to the point 64 or at the center 65 or at the other side 66, all within the view of persons in front of the window 8. By the length of the contact 61 is regulated the duration of the illumination of the objects so that they may appear to be positioned at any of the points 64, 65 or 66, or may appear to move between the three points as desired.

Figure 8 illustrates another arrangement of planes such as 67 and 68 reflecting the animate objects 69 such as fish and aquatic life and objects 70 such as birds, monkeys, etc. incapable of living under water onto or in front of the belt or moving sign 71 which may display advertising. The tank of water 72 with fish, etc. may be provided with air jets 73 to cause bubbles to rise through the water 74 and behind the tank the projecting lights 74' may be arranged. Likewise the enclosure 75 may be illuminated as well as the birds, etc. in it with the projector lights 76 and 77 and behind the enclosure 75 a jet of steam 78 giving a moving cloudy background may be provided.

The enlarged fragmentary view of the non-reflecting wall and partition surfaces may be seen in Figure 9 of the drawings, and one of the uses of my device may be seen in Figure 10 in which my housing is located in a show window.

In the drawings and description herein, I have disclosed the construction of my device, and have shown some of the simple effects lending interest in advertising display which may be seen through the window of my housing and it may be modified in many ways to produce many interesting advertising displays suggested by the construction herein disclosed may be made by modifying the construction. I do not wish to be limited to the details of construction shown and described herein as I may wish to depart therefrom within the scope of the appended claims.

I claim:

1. In an advertising device, a housing, a transparent reflecting plane held therein, and illuminated objects in said housing and a window through which the reflection of said objects may be seen and means positioned to obscure said objects from sight or vision through said window and a second transparent plane positioned to reflect one of said objects not reflected by the other transparent plane.

2. In a projector, a plurality of objects and a window through which the reflected image of said objects may be viewed, means concealing said objects from view of said window and illuminating means for said objects either independent of each other or collectively and a plurality of transparent reflecting planes bringing the reflected image of some of said objects into view through said window, and means for moving one of said transparent planes in angular relationship with said objects and the other of said planes whereby the reflected image of certain of said objects may be caused to appear to move in relationship to others of said objects.

3. In an advertising device, a housing, a transparent reflecting plane movably held therein, illuminated objects in said housing and a window through which the reflections of said objects may be seen, means positioned to obscure said reflected objects from sight or vision through said window and means for moving said reflecting plane to cause said reflected objects to appear in motion.

4. In a projector a housing having non-reflecting surfaces therein, a plurality of objects illuminated by lights, a window in said housing and means positioned to conceal said objects from view therethrough and to permit the reflection from said objects to be viewed through said window, and transparent planes in said housing adapted to reflect, project and bring into view through said window the reflected image of said objects.

5. In a projector a housing having non-reflecting surfaces therein, a plurality of objects illuminated by lights, a window in said housing and means positioned to conceal said objects from view through said window and to permit the reflection of the image from said objects to be viewed through said window, means for showing the reflection of one of said objects through said window, means for showing other of said objects within view through said window, and means for moving said reflecting means in relation to said objects to cause motion to the reflected image.

6. In a projector, a housing and window through which the reflection of animate and inanimate objects may be seen in said housing said objects being out of view of said window and may be viewed collectively or separately and a plurality of transparent planes within view of said window for reflecting the images of said objects to a point within view through said window, partitions and walls obscuring said objects, and non-reflecting surfaces on said walls and partitions to obscure said reflecting means and said walls and partitions.

CECIL A. STOKES.